United States Patent [19]

Harth

[11] 4,102,049
[45] Jul. 25, 1978

[54] GRIP MEASURING DEVICE

[76] Inventor: Carl A. Harth, 1205 Wynnewood Dr., West Palm Beach, Fla. 33409

[21] Appl. No.: 759,664

[22] Filed: Jan. 17, 1977

[51] Int. Cl.$^2$ .............................................. G01B 3/02
[52] U.S. Cl. ................................... 33/1 B; 33/174 D
[58] Field of Search ................. 33/1 B, 174 D, 174 F, 33/11–16

[56] References Cited

U.S. PATENT DOCUMENTS

| 1,372,732 | 3/1921 | Wodrich | 33/1 B |
| 1,703,273 | 2/1929 | Hoban | 33/1 B |
| 2,326,030 | 8/1943 | Hearn | 33/174 D |
| 2,605,548 | 8/1952 | Clarke | 33/2 R |
| 3,238,628 | 3/1966 | Snakard | 33/174 F |

Primary Examiner—Richard E. Aegerter
Assistant Examiner—John W. Shepperd
Attorney, Agent, or Firm—Malin & Haley

[57] ABSTRACT

A device for measuring the grip size of a human hand to determine the proper size of a sporting implement handle such as found on a tennis racket or the like, the device comprising a rigid, transparent planar surface, said surface having indicia disposed thereupon showing the outline of a human hand, and indicia showing a measurement scale on a straight line measured from the tip of the ring finger toward the central palm area of the inscribed human hand. A zero reference line may be disposed adjacent the tip of the ring finger with the measurement described being disposed between the ring finger and middle finger. Additional indicia marks showing representative palm crease lines may be included on the planar surface. A proper grip size for use with a tennis racket or other sporting implement is found by measuring the distance from the tip of the ring finger to the straight line intersection of the second or lower palm crease which in most palms, is the longer crease line, disposed near the central portion of the palm. The device is employed by placing the hand within the human indicia outline and registering the tip of the ring finger of a human hand with the indicia human hand outline, observing the measurement scale intersection between the actual second or middle crease of the hand observed through the transparent device with the hand pressed thereagainst. The device may include indicia outlines and measurement scales for both left and right hands.

1 Claim, 1 Drawing Figure

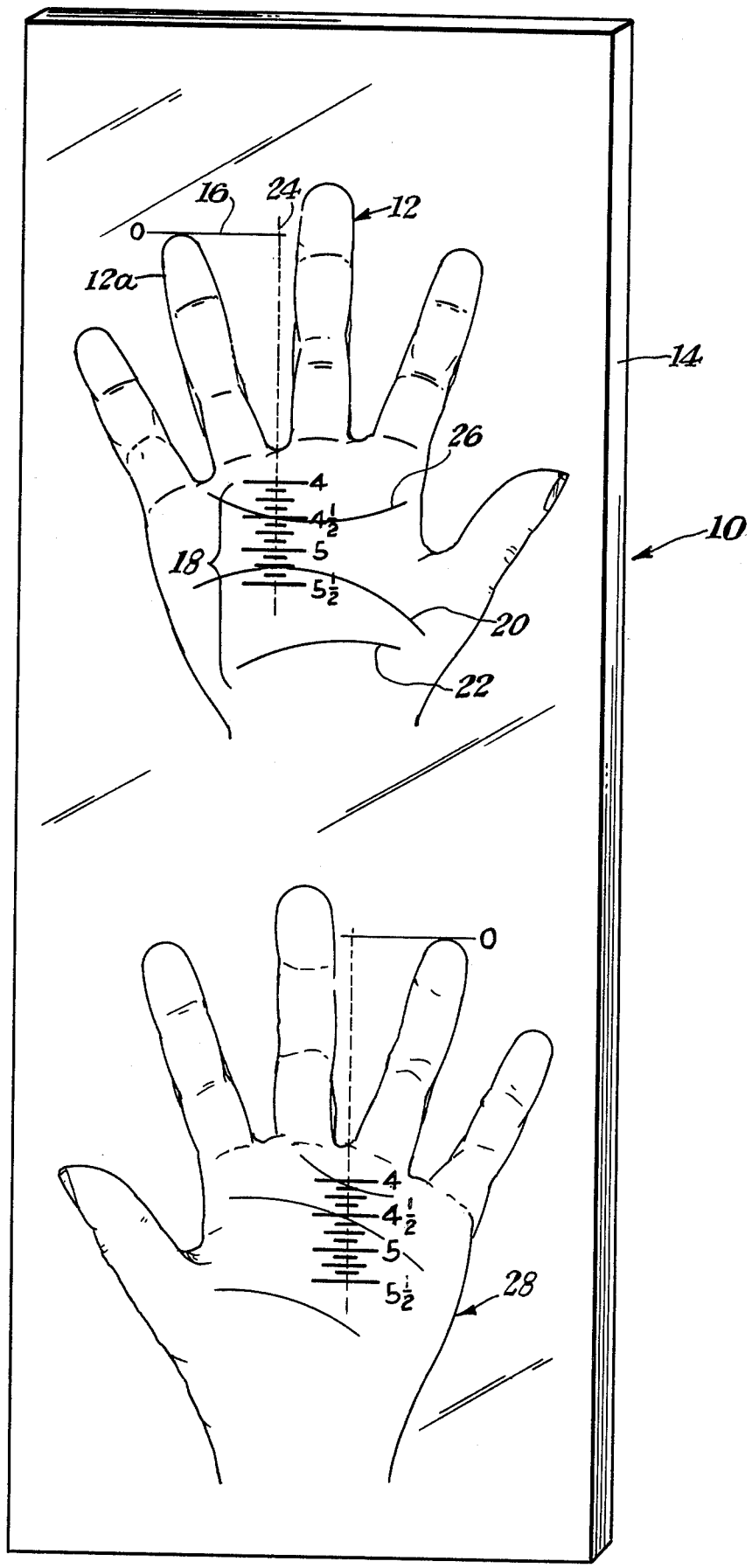

GRIP MEASURING DEVICE

BACKGROUND OF THE INVENTION

This invention relates generally to a measuring device which is utilized to determine the proper grip size for tennis rackets or the like with extreme accuracy and efficiency.

In the past, several devices have been utilized for measuring various parts of the anatomy including the hand which have been quite complicated in construction to achieve particular accuracy. The use of the present device allows one, in a matter of seconds, to quickly but accurately determine the proper size grip for use with sporting instrument handles such as tennis rackets or the like whereby the hand will properly fit about the circumference of the handle.

With the present invention, a transparent template or measuring device is provided which shows indicia registration marks to allow registration alignment between the tip of the ring finger of the hand and includes a measurement scale in any convenient unit such as inches or centimeters to allow visual, rapid determination of the distance from the tip of the ring finger on either hand to the second or lower palm crease found on a hand which provides an extremely accurate measurement for use in determining the grip size of a tennis racket or the like.

BRIEF DESCRIPTION OF THE INVENTION

A device for use in determining the proper size grip for a tennis racket or the like comprising a rigid, transparent plate, said plate having an indicia outline of a human hand and a measurement scale including incremental measurement indicia substantially in a straight line disposed between the ring finger and the middle finger of the indicia hand outline proceeding towards the central area of the palm, the device being useful in determining the distance between the tip of the ring finger of a human hand and the second or lower crease found in the palm of the human hand, this measurement being found to be the proper grip size for a tennis racket. The plate may further include indicia showing representative palm crease marks to insure that the user utilized the second palm crease in his hand in making the measurement determinaion. The indicia registration measurement scale may further include a zero scribe mark disposed at the top of the ring finger of the indicia outline on the plate.

To use the device one need only place his hand against the planar surface and dispose the fingers of the hand within the indicia hand outline, while placing the tip of the ring finger adjacent or aligned with the scale registration zero line at the tip of the indicia ring finger. Then by visually observing the hand through the plate, and using the incremental scale marks showing measurement from the tip of the ring finger, one can readily determine proper grip size by observing the particular measurement increment indicia closest to the second or lower crease in the palm which intersects a line disposed between the middle and ring fingers upon which the scale indicia lie.

It is an object of this invention to provide an anatomical measuring device for the human hand to quickly and simply provide grip measurement with extreme accuracy.

It is another object of this invention to provide a template for measuring a tennis racket grip which can be done efficiently and quickly, the device having no moving parts.

But yet still another object of this invention is to provide a grip measuring device to determine the distance from the tip of the ring finger of a human hand to the lower second crease, with the hand being disposed in a rapid short period of time.

In accordance with these and other objects which will be apparent hereinafter, the instant invention will now be described with particular reference to the accompanying drawings.

BRIEF DESCRIPTION OF THE DRAWINGS

The drawing shows a perspective view of the instant invention and one particular embodiment.

PREFERRED EMBODIMENT OF THE INVENTION

Referring now to the drawing, the instant invention is shown generally at 10 comprised of a rigid, flat rectangular transparant plate 14 which may be constructed of plastic, glass or other similar transparent material, the plate having inscribed or disposed on one side the outline of a human hand 12 showing normal fingers and thumbs, and including ring finger 12a. Also disposed at the tip of the ring finger 12a and engraved on the surface of plate 14 is a line 16 which is used to act as a zero reference point for the measurement to be described below. Additional indicia such as a plurality of measurement marks shown as marks 18 are disposed to provide the proper measurement along a straight line distance shown as dotted line 24 beginning at line 16 on the tip of the ring finger 12a towards the central palm area, and specifically in the area shown by line 20 which represents the longest palm crease which is the second lower crease below line 26 which represents the upper palm crease. An additional palm crease 22 shown by line 22 is included to provide a representative palm and crease relationship. In order to measure either right or left hands, a symmetrically similar indicia outline is provided as shown by hand outline 28 which functions the same as outline 12.

In order to determine the proper tennis grip for an individual, the grip size is a function of the distance from the tip of the ring finger to the longest (or the second lower palm crease) to provide the proper grip fit. The measurement is along the line disposed between the ring finger and the middle finger represented as dotted line 24. The measurement scale 18 is premeasureed for accuracy and disposed and written on the surface of the plate 14, as measured from line 16. To measure the proper grip size, one places his hand in registration with the outline 12 on the plate on the opposite side of the plate and aligns one's ring finger tip with line 16, which is the zero scale registration line on the plate. Then one observes through the plate the longest palm crease and the scale increment closest to the longest palm crease of the particular hand being measured. As shown in the drawing, the outline may be utilized for measuring the grip size of the right hand of the person being measured, while the lower indicia 28 may be utilized for measuring the left hand. The outline and the scribe marks may be etched into the material or may be painted on with a suitable indicia forming material. The incremental scale marks of measurement 18 may be in any suitable measurement scale including inches, centimeters, or equivalent measuring scales.

The instant invention may be disposed for determining grip size for other sporting implements or shaft type objects which are gripped which are substantially cylindrical in which the user grasps around the shaft. The device may also be modified to measure glove sizes by providing measurement marks for each finger and palm size determined from a particular reference point.

The instant invention has been shown and described herein in what is considered to be the most practical and preferred embodiment. It is recognized, however, that departures may be made therefrom within the scope of the invention and that obvious modifications will occur to a person skilled in the art.

What I Claim is:

1. A device for measuring the size of the human hand to establish a grip size for use in determining a tennis racquet grip size or the like comprising:
   a rigid, transparent planar surface;
   an indicia outline of a human hand disposed on said surface and an indicia line disposed on said surface representing the longest palm crease of a human hand within said human hand outline;
   a plurality of incremental measurement marks disposed on said surface displaying measurement values measured from the outline ring finger tip to the central hand outline indicia, said measurement marks being representative of the distance from the ring finger tip to a palm crease on the hand, said measurement marks being disposed in an area relative to the human hand outline to provide measurement from the ring finger tip to a particular palm crease of the human hand.

* * * * *